(12) United States Patent
Tsiaflakis

(10) Patent No.: US 11,128,498 B2
(45) Date of Patent: Sep. 21, 2021

(54) COMMUNICATION-CHANNEL TRACKING AIDED BY REINFORCEMENT LEARNING

(71) Applicant: Nokia Solutions and Networks OY, Espoo (FI)

(72) Inventor: Paschalis Tsiaflakis, Schriek (BE)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/800,124

(22) Filed: Feb. 25, 2020

(65) Prior Publication Data

US 2021/0266202 A1 Aug. 26, 2021

(51) Int. Cl.
*H03H 7/40* (2006.01)
*H04L 25/03* (2006.01)
(Continued)

(52) U.S. Cl.
CPC ........ *H04L 25/03165* (2013.01); *G06F 17/17* (2013.01); *G06N 5/04* (2013.01);
(Continued)

(58) Field of Classification Search
CPC ......... H04L 25/0349; H04L 2025/0349; H04L 25/03038; H04L 2027/0065; H04L 2027/0067; H04L 2027/0069; H04B 3/23
(Continued)

(56) References Cited

U.S. PATENT DOCUMENTS 7,512,573 B2   3/2009   Martinez
8,218,757 B2*  7/2012   Takada ............... H04M 9/082
                                                 379/406.08
(Continued)

FOREIGN PATENT DOCUMENTS

WO   2019192740 A1   10/2019
WO   2020015840 A1    1/2020

OTHER PUBLICATIONS

Ali, Rashid, et al. "Deep Reinforcement Learning Paradigm for Performance Optimization of Channel Observation-Based MAC Protocols in Dense WLANs." IEEE Access vol. 7 (2018): 3500-3511.

Collins Travis F., et al. "Software-Defined Radio for Engineers—Chapter 9: Channel Estimation and Equalization." United Kingdom, Artech House (2018): 253-266.

(Continued)

*Primary Examiner* — Khai Tran
(74) *Attorney, Agent, or Firm* — Mendelsohn Dunleavy, P.C.; Yuri Gruzdkov

(57) ABSTRACT

A digital circuit for implementing a channel-tracking functionality, in which an adaptive (e.g., FIR) filter is updated based on reinforcement learning. In an example embodiment, the adaptive filter may be updated using an LMS-type algorithm. The digital circuit may also include an electronic controller configured to change the convergence coefficient of the LMS algorithm using a selection policy learned by applying a reinforcement-learning technique and based on residual errors and channel estimates received over a sequence of iterations. In some embodiments, the electronic controller may include an artificial neural network. An example embodiment of the digital circuit is advantageously capable of providing improved performance after the learning phase, e.g., for communication channels exhibiting variable dynamicity patterns, such as those associated with aerial copper cables or some wireless channels.

19 Claims, 8 Drawing Sheets

(51) Int. Cl.
  *G06N 5/04* (2006.01)
  *G06N 20/00* (2019.01)
  *G06F 17/17* (2006.01)
  *H04L 25/02* (2006.01)

(52) U.S. Cl.
  CPC ......... *G06N 20/00* (2019.01); *H04L 25/0202* (2013.01); *H04L 25/03057* (2013.01); *H04L 25/03261* (2013.01); *H04L 25/03267* (2013.01); *H04L 25/03292* (2013.01)

(58) Field of Classification Search
  USPC ........................................................ 375/233
  See application file for complete search history.

(56) References Cited

U.S. PATENT DOCUMENTS

| | | | |
|---|---|---|---|
| 8,923,672 B2 | 12/2014 | Bernasconi et al. | |
| 2006/0176947 A1* | 8/2006 | Lim | H04L 1/0054 375/232 |
| 2010/0027804 A1* | 2/2010 | Kano | G10K 11/17825 381/71.11 |
| 2013/0259277 A1* | 10/2013 | Kojima | H04R 25/453 381/317 |
| 2013/0322638 A1* | 12/2013 | Lee | H04B 3/235 381/66 |
| 2015/0100530 A1 | 4/2015 | Mnih et al. | |
| 2019/0272465 A1* | 9/2019 | Kimura | G06N 3/0481 |
| 2019/0272467 A1 | 9/2019 | Kearney | |

OTHER PUBLICATIONS

Dabney, William C. "Adaptive Step-Sizes for Reinforcement Learning", Doctoral Disseration, University of Massachusetts Amherst (2014): 1-148.
Gu, Yuan Tao, et al. "Optimal Step-size Update Equation in Nonstationary Environment and OVS-LMSII Algorithm." IEEE 2002 International Conference on Communications, Circuits and Systems and West Sino Expositions, Chengdu, China. vol. 2. (2002): 1252-1256).
Guresen, Erkam, et al., "Definition of Artificial Neural Networks with Comparison to Other Networks." Procedia Computer Science 3 (2011): 426-433.
Lin, Hsuan-Yu, et al. "An Adaptive Robust LMS Employing Fuzzy Step Size and Partial Update" IEEE Signal Processing Letters 12.8 (2005): 545-548.
Mahmood, Ashique Rupam, et al. "Tuning-free step-size adaptation." 2012 IEEE International Conference on Acoustics, Speech and Signal Processing (ICASSP), Kyoto, Japan (2012): 1-4.
Wen, Jyh-Horng, et al. "OFDM Channel Prediction Using Fuzzy Update LMS Algorithm in Time-Variant Mobile Channel." Proc. IEEE 64th Vehicular Technology Conference, Montreal, Canada (2006): 1-5.
Woo, Hong Chae "Variable Step Size LMS Algorithm using Squared Error and Autocorrelation of Error." Procedia Engineering 41 (2012): 47-52.
Extended European Search Report for corresponding European application No. 21156529.6; dated Jul. 16, 2020 (10 pages).
De Vrieze, Colin, et al., "Cooperative Multi-Agent Reinforcement Learning for Low-Level Wireless Communication." arXiv.org preprint, arXiv:1801.04541 (2018): 1-15.

* cited by examiner

200

|  | $F_k < 0.002$ | $F_k \geq 0.002$ |
|---|---|---|
| $0 < E_k$ | STATE=1 | STATE=7 |
| $-10 < E_k \leq 0$ | STATE=2 | STATE=8 |
| $-20 < E_k \leq -10$ | STATE=3 | STATE=9 |
| $-30 < E_k \leq -20$ | STATE=4 | STATE=10 |
| $-40 < E_k \leq -30$ | STATE=5 | STATE=11 |
| $E_k \leq -40$ | STATE=6 | STATE=12 |

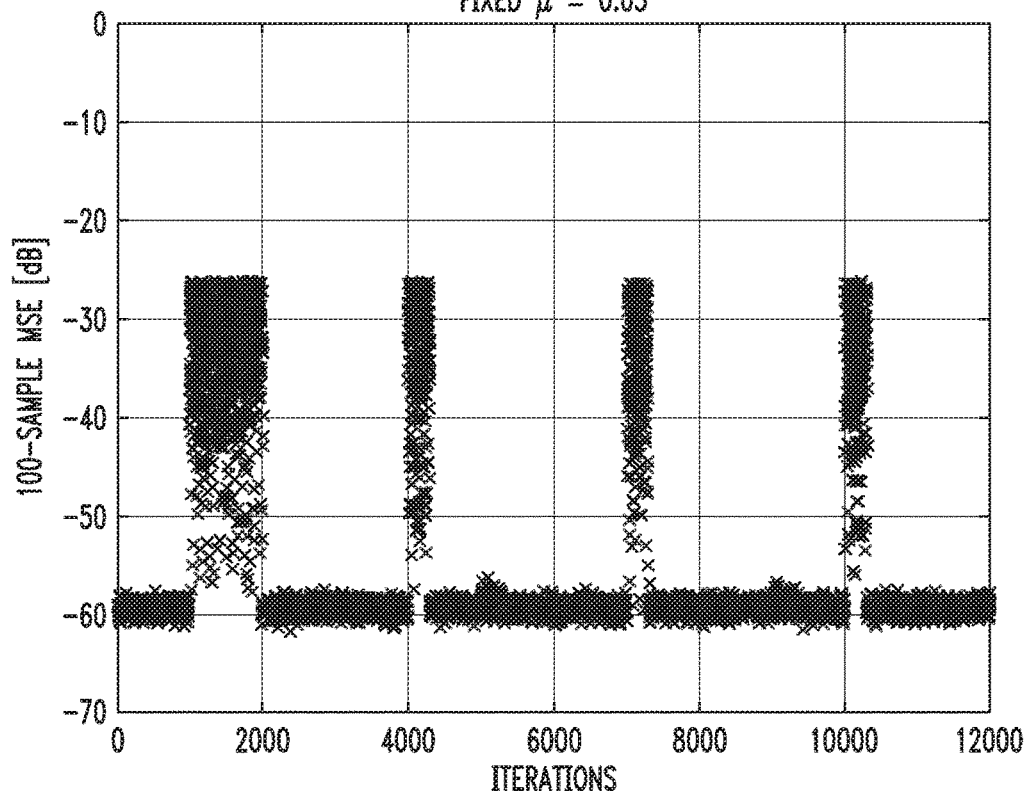
FIG. 10A  FIXED μ = 0.05
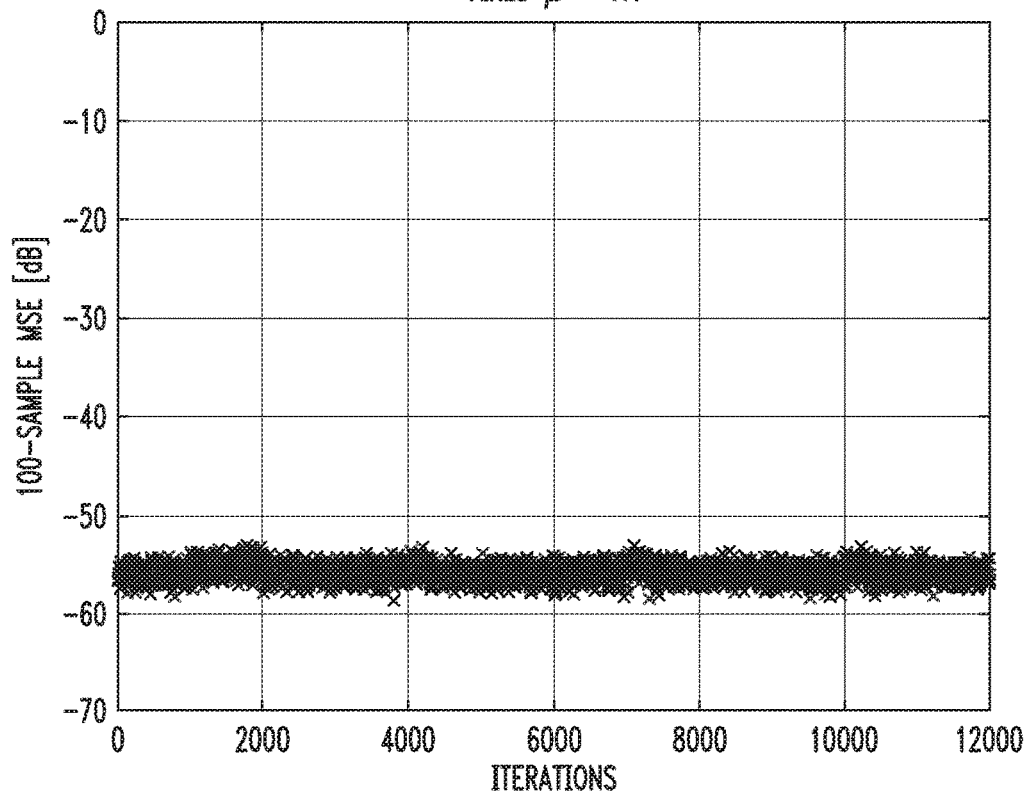
FIG. 10B  FIXED μ = 1.1

COMMUNICATION-CHANNEL TRACKING AIDED BY REINFORCEMENT LEARNING

BACKGROUND

Field

Various example embodiments relate to communication equipment and, more specifically but not exclusively, to estimating the state of a communication channel.

Description of the Related Art

This section introduces aspects that may help facilitate a better understanding of the disclosure. Accordingly, the statements of this section are to be read in this light and are not to be understood as admissions about what is in the prior art or what is not in the prior art.

Acquiring accurate channel information is important for many communication systems. The acquired channel information can be used, e.g., for dynamic bit loading and/or signal equalization. For example, for a "bad" communication channel, only one bit or two bits per constellation symbol may have to be transmitted to achieve a target bit error rate (BER), whereas, for a "good" communication channel, more than ten bits per constellation symbol can be transmitted for the same target BER. Accordingly, the data transmitter may be configured to dynamically change the bit loading based on the observed channel conditions. Alternatively or in addition, channel equalization can be applied, e.g., to mitigate the detrimental effects of multipath interference and fading.

Some communication channels can be very dynamic. Some communication channels may also exhibit certain dynamicity patterns that are difficult to describe with tractable mathematical models. In such communication systems, the use of conventional channel-tracking algorithms may lead to suboptimal and/or unsatisfactory performance.

SUMMARY OF SOME SPECIFIC EMBODIMENTS

Disclosed herein are various embodiments of a digital circuit for implementing a channel-tracking functionality, in which an adaptive (e.g., finite-impulse-response, FIR) filter is updated based on reinforcement learning. In an example embodiment, the adaptive filter may be updated using a least-mean-squares (LMS) algorithm or a functionally similar algorithm. The digital circuit may also include an electronic controller configured to change the convergence coefficient $\mu$ of the LMS-type algorithm using a selection policy learned by applying a reinforcement-learning technique and based on residual errors and channel estimates received over a sequence of iterations. In some embodiments, the electronic controller may include an artificial neural network (ANN).

An example embodiment of the digital circuit is advantageously capable of providing improved performance after the learning phase, e.g., for communication channels exhibiting variable dynamicity patterns, such as those associated with aerial copper cables or some wireless channels.

According to an example embodiment, provided is an apparatus comprising a data receiver and at least one digital signal processor connected to process a digital signal representing a communication signal received by the data receiver; and wherein the at least one digital signal processor comprises an adaptive filter and an electronic controller, the adaptive filter being iteratively updated to filter the digital signal, the electronic controller controlling a rate of convergence of the adaptive filter based on reinforcement learning.

According to another example embodiment, provided is an apparatus comprising: at least one processor; and at least one memory including program code; and wherein the at least one memory and the program code are configured to, with the at least one processor, cause the apparatus at least to: (A) perform adaptive filtering of received communication-channel-impaired data; and (B) iteratively update said adaptive filtering while controlling a rate of convergence of said adaptive filtering based on reinforcement learning.

In some embodiments of the above apparatus, the at least one memory and the program code are further configured to, with the at least one processor, cause the apparatus to perform said reinforcement learning based on an artificial neural network.

In some embodiments of any of the above apparatus, the at least one memory and the program code are further configured to, with the at least one processor, cause the apparatus to update the adaptive filtering based on a least mean squares algorithm and based on an error signal produced using a filtered signal generated by said adaptive filtering of the received communication-channel-impaired data.

In some embodiments of any of the above apparatus, the at least one memory and the program code are further configured to, with the at least one processor, cause the apparatus at least to control the rate of convergence of the adaptive filtering by changing a convergence coefficient of the least mean squares algorithm based on the error signal and a history of the iterative updates.

In some embodiments of any of the above apparatus, the at least one memory and the program code are further configured to, with the at least one processor, cause the apparatus at least to further perform said reinforcement learning based on an $\varepsilon$-greedy method with a variable tradeoff factor.

In some embodiments of any of the above apparatus, the at least one memory and the program code are further configured to, with the at least one processor, cause the apparatus at least to further perform said reinforcement learning by defining a plurality of states using one or more features based on an error signal and a history of the iterative updates, and using said plurality of states during said reinforcement learning.

In some embodiments of any of the above apparatus, the at least one memory and the program code are further configured to, with the at least one processor, cause the apparatus to perform communication-channel estimation or communication-signal equalization.

In some embodiments of any of the above apparatus, the apparatus further comprises an end-user device of a communications network. This communications network can be a wireless communications network or a wired communications network, or any combination of wireless and wired communications network. The end-user device can be a mobile end-user apparatus or a fixed end-user apparatus.

In some embodiments of any of the above apparatus, the apparatus further comprises a network node of a communications network. Also, for an example one of such embodiments, the communications network can be a wireless communications network or a wired communications network, or any combination of wireless and wired communications network.

In case of a wireless communications system, the network node can be a base station.

In some embodiments of any of the above apparatus, the network node can be an optical line termination unit of a passive optical network.

In some embodiments of any of the above apparatus, the network node can be a distribution point unit of an xDSL network.

According to yet another example embodiment, provided is a non-transitory machine-readable medium, having encoded thereon program code, wherein, when the program code is executed by a machine, the machine implements a method comprising: (A) performing adaptive filtering of received communication-channel-impaired data; and (B) iteratively updating said adaptive filtering while controlling a rate of convergence of said adaptive filtering based on reinforcement learning.

According to yet another example embodiment, provided is a machine-executed method comprising the steps of: performing adaptive filtering of received communication-channel-impaired data; and iteratively updating said adaptive filtering while controlling a rate of convergence of said adaptive filtering based on reinforcement learning.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 10A-10C graphically illustrate example performance improvements that can be obtained using an embodiment.

DETAILED DESCRIPTION

Figure 1:
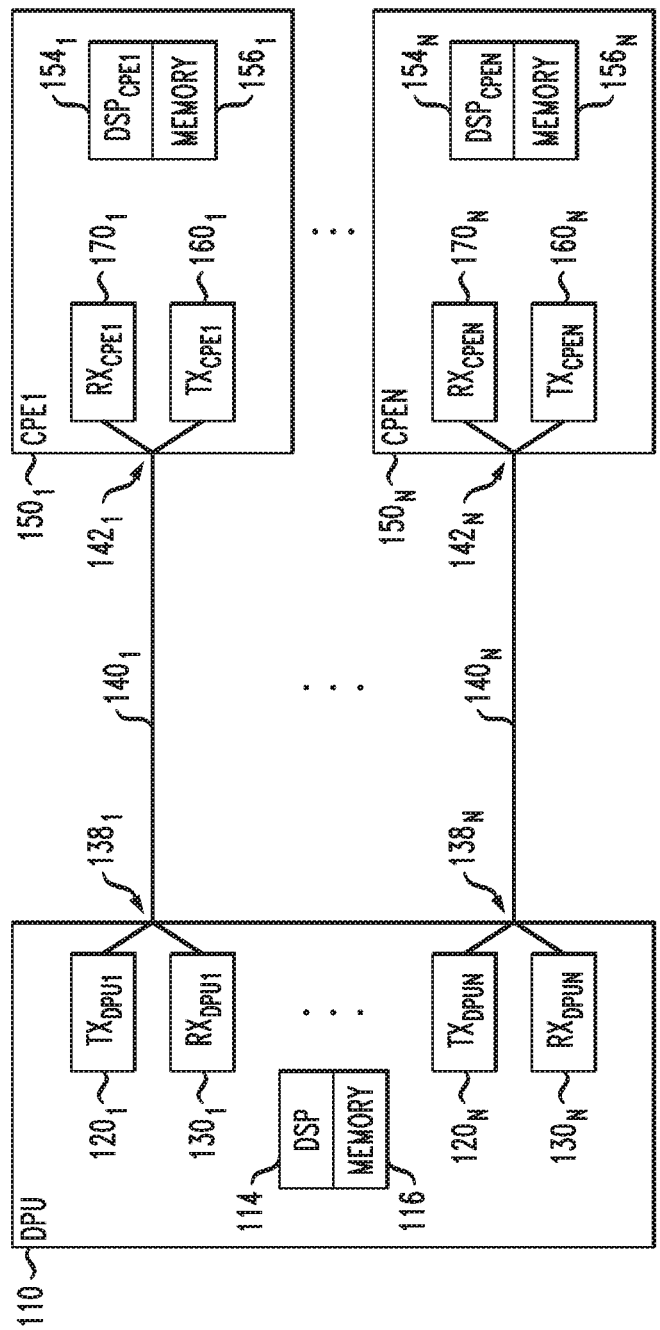
FIG. 1 shows a block diagram of a communication system in which some embodiments can be practiced.

An artificial neural network (ANN) may implement an information-processing paradigm developed based on certain features of biological nerve systems, such as, for example, the brain. An example processing circuit, device, or system for such an information-processing paradigm may be constructed using a plurality of interconnected processing elements (PEs; also sometimes referred to as ANN nodes or artificial neurons) that are designed and configured to work together to solve a specific problem. In some ANNs, the number of such PEs may be relatively large. Because some such ANNs can learn by example, such ANNs can be trained for a specific application, such as pattern recognition, data classification, parameter-field optimization, etc. The corresponding learning process typically involves iterative adjustment of synaptic connections between different artificial neurons and/or decision making in the neuron core.

As used herein, the term "ANN" refers to a distributed and typically nonlinear trainable circuit or machine constructed using a plurality of processing elements (PEs). Also, an ANN may be dynamically adaptive. Each PE has connections with one or more other PEs. The plurality of connections between the PEs defines the ANN's topology. In some topologies, the PEs may be aggregated into layers. Different layers may have different types of PEs configured to perform different respective kinds of transformations on their inputs. Signals may travel from the first PE layer (typically referred to as the input layer) to the last PE layer (typically referred to as the output layer). In some topologies, the ANN may have one or more intermediate PE layers (typically referred to as the hidden layers) located between the input and output PE layers. An example PE may scale, sum, and bias the incoming signals and use an activation function to produce an output signal that is a static nonlinear function of the biased sum. The resulting PE output may become either one of the ANN's outputs or be sent to one or more other PEs through the corresponding connection(s). The respective weights and/or biases applied by individual PEs can be changed during the training (or learning) mode of operation and are typically temporarily fixed (constant) during the payload (or working) mode of operation.

Some additional features and characteristics that may be pertinent to the definition of the term "ANN" are reviewed, e.g., in E. Guresen, G. Kayakutlu, "Definition of Artificial Neural Networks with Comparison to Other Networks," Procedia Computer Science, 3 (2011), pp. 426-433, which is incorporated herein by reference in its entirety.

Least mean squares (LMS) algorithms are used in adaptive signal filtering to approximate a desired filter behavior by finding the filter coefficients (weights) that relate to the least mean square of the error signal (e.g., the difference between the desired and actual signals). An LMS algorithm typically relies on a stochastic gradient-descent method in that the filter weights are only adapted based on the error at the current time. In an example implementation, an LMS algorithm may start by assuming some small filter weights and then, at each step, find the gradient of the mean square error (MSE). The filter weights are then updated (increased or decreased) based on the sign and magnitude of the MSE gradient. The LMS algorithm thus tends to drive the system towards the MSE minimum. The step size with which the filter weights are updated is controlled by a particular LMS-algorithm parameter, which is typically referred-to in the relevant literature as the convergence coefficient $\mu$. At least some embodiments disclosed herein provide methods and apparatus for adaptively controlling the convergence coefficient $\mu$, e.g., using an ANN.

FIG. 1 shows a block diagram of a communication system 100 in which some embodiments can be practiced. System 100 comprises a distribution point unit (DPU) 110 and a plurality of customer-premise-equipment (CPE) units 150$_1$-150$_N$ connected by way of subscriber lines 140$_1$-140$_N$ as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. CPE units $150_1$-$150_N$ are typically located at different respective customer sites. In some embodiments, DPU 110 can be implemented and referred to as an access node (AN) 110.

Each of subscriber lines $140_1$-$140_N$ typically comprises a respective "twisted-pair" (or other suitable) cable configured to transmit signals corresponding to voice and/or data services. At DPU 110, each of subscriber lines $140_1$-$140_N$ is connected to a respective one of input/output (I/O) ports $138_1$-$138_N$. At the CPE side, each of subscriber lines $140_1$-$140_N$ is similarly connected to a respective one of I/O ports $142_1$-$142_N$, each being an I/O port of a respective one of CPE units $150_1$-$150_N$.

In an example embodiment, DPU (or AN) 110 comprises a plurality of transceivers ($120_i/130_i$), each internally connected to a respective one of I/O ports $138_1$-$138_N$, where i=1, 2, ..., N. A transceiver ($120_i/130_i$) includes a respective transmitter $120_i$ and a respective receiver $130_i$. DPU (or AN) 110 further comprises at least digital signal processor (DSP) 114 operatively connected to transceivers ($120_i/130_i$) and at least one memory 116 to perform at least some of the signal processing needed for proper operation thereof.

In an example embodiment, a CPE unit $150_i$ comprises a transceiver ($160_i/170_i$) internally connected to I/O port $142_i$ of that CPE unit. A transceiver ($160_i/170_i$) includes a respective transmitter $160_i$ and a respective receiver $170_i$. CPE unit $150_i$ further comprises at least one DSP $154_i$ operatively connected to transceiver ($160_i/170_i$) and a memory $156_i$ to perform at least some of the signal processing needed for proper operation thereof.

In some embodiments, system 100 may be a digital-subscriber-line (DSL) system.

In an example embodiment, some or all of DSPs 114 and $154_1$-$154_N$ and memories 116 and $156_1$-$156_N$ can be used to implement at least some of the embodiments described below in reference to FIGS. 4-10.

Figure 2:
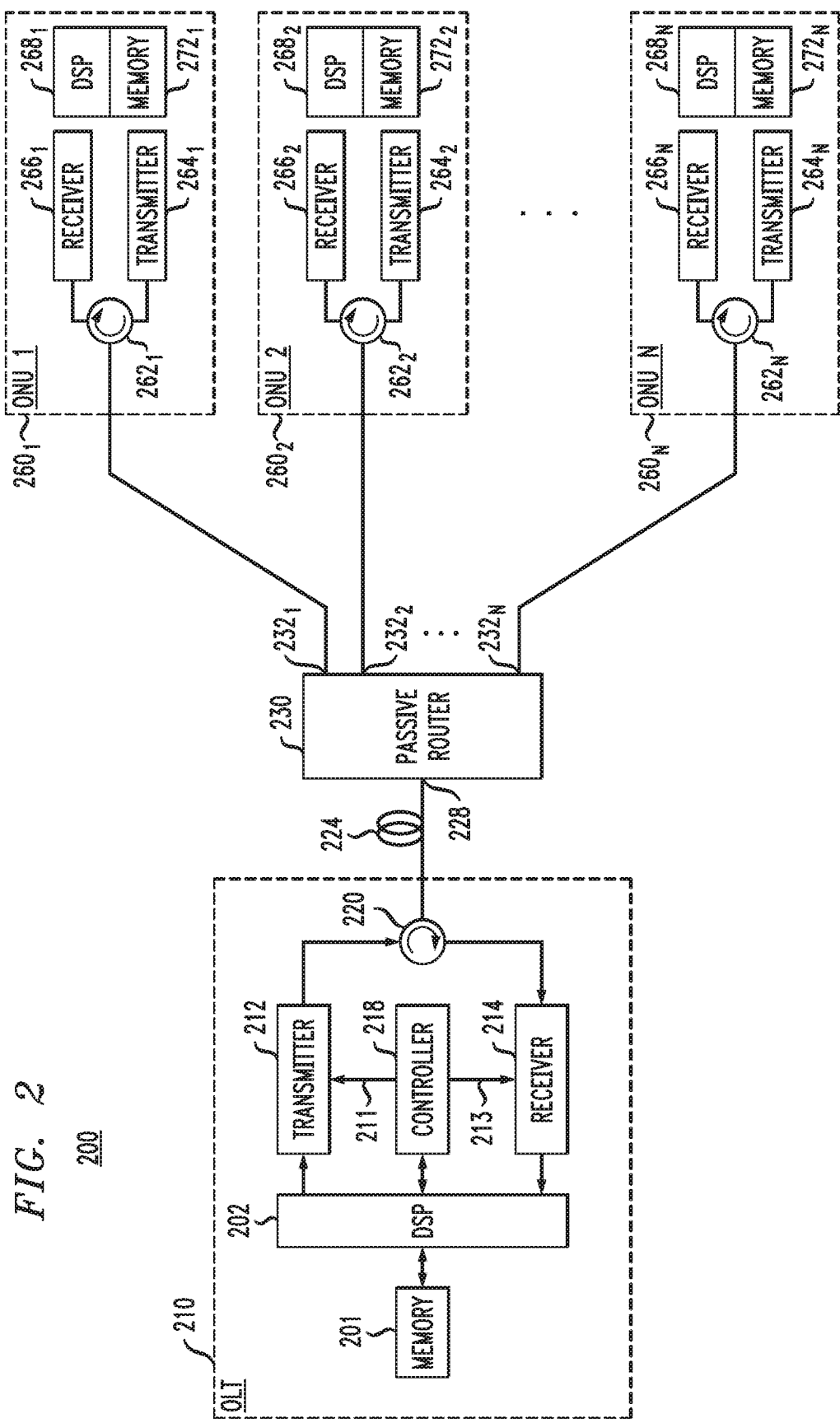
FIG. 2 shows a block diagram of another communication system in which some other embodiments can be practiced.

FIG. 2 shows a block diagram of a passive-optical-network (PON) system 200 in which some other embodiments can be practiced. System 200 has an optical line terminal (OLT) 210 configured to communicate with optical network units (ONUs) $260_1$-$260_N$. Herein, the number N can be, e.g., in the range from 2 to 256. In some cases, ONUs $260_1$-$260_N$ can be configured to use (nominally) the same carrier wavelength for uplink transmissions. In some other cases, ONUs $260_1$-$260_N$ can be configured to use different respective carrier wavelengths for uplink transmissions.

OLT 210 comprises an optical transmitter 212 and an optical receiver 214, both coupled, by way of an optical circulator 220 or other suitable directional optical coupler (e.g., an optical diplexer or triplexer based on thin-film technologies), to an optical fiber 224. Operation, functions, and configurations of transmitter 212 and receiver 214 can be managed and controlled using control signals 211 and 213 generated by an electronic controller 218, which can be a part of a processor in some embodiments. A DSP 202 that is coupled to a memory 201, transmitter 212, receiver 214, and controller 218 can be used for signal and data processing and, optionally, for supporting some functions of the controller. In an example embodiment, optical fiber 224 can have a length between about 1 km and about 40 km.

Transmitter 212 is typically configured to broadcast downlink signals to ONUs $260_1$-$260_N$ using one or more downlink carrier wavelengths, with a suitable time-division multiplexing (TDM) protocol being used to transmit signals intended for different ONUs. Receiver 214 is configured to receive uplink signals from ONUs $260_1$-$260_N$ transmitted using one or more uplink carrier wavelengths. A suitable time division multiple access (TDMA) protocol executed using controller 218 is typically used to prevent collisions, at receiver 214, between the uplink signals generated by different ONUs 260.

Optical fiber 224 connects OLT 210 to one or more passive routers 230. Depending on the embodiment, router 230 can be implemented using: (i) a (1×N) passive optical splitter/combiner; (ii) a passive wavelength router (e.g., an arrayed waveguide grating, AWG); or (iii) any suitable combination of wavelength-insensitive and/or wavelength-sensitive passive optical elements. A typical router 230 has (N+1) optical ports, including a single port 228 at its first or uplink side and a set of N ports $232_1$-$232_N$ at its second or downlink side. Herein, the term "side" is used in an abstract sense to indicate "uplink" or "downlink" directions rather than in a physical-orientation sense. Port 228 is internally optically connected to each of ports $232_1$-$232_N$. Port 228 is externally optically connected to optical fiber 224 as indicated in FIG. 2. Ports $232_1$-$232_N$ are externally optically connected to ONUs $260_1$-$260_N$, respectively, e.g., via optical fibers, as further indicated in FIG. 2, or via more complex, passive optical-fiber networks. Example devices that can be used to implement router 230 are disclosed, e.g., in U.S. Pat. No. 8,923,672, which is incorporated herein by reference in its entirety.

Typically, each of ONUs $260_1$-$260_N$ includes a respective optical circulator $262_i$ or other suitable directional optical coupler, a respective optical transmitter $264_i$, a respective optical receiver $266_i$, and at least one respective DSP $268_i$ and at least one respective memory $272_i$. Optical circulator $262_i$ is configured to (i) direct downlink signals received from router 230 to optical receiver $266_i$ and (ii) direct uplink signals from optical transmitter $264_i$ to router 230. DSP $268_i$ is operatively connected to optical transmitter $264_i$ and optical receiver $266_i$ to perform at least some of the signal processing needed for proper operation thereof.

In an example commercial application, system 200 can be configured to operate such that all downlink signals are spectrally located in a spectral band near 1.55 μm, and all uplink signals are spectrally located in a spectral band near 1.3 μm, or vice versa. In such cases, all or some of optical circulators 220 and 262 may be replaced by respective optical band-pass or dichroic optical filters.

While FIG. 2 illustrates a PON system with a single passive optical router 230, more-complex PON architectures are also possible, such as PON architectures having multiple passive optical routers and tree-and-branch sub-topologies.

In an example embodiment, some or all of DSPs 202 and $268_1$-$268_N$ and memories 201 and $272_1$-$272_N$ can be used to implement at least some embodiments described below in reference to FIGS. 4-10.

Figure 3:
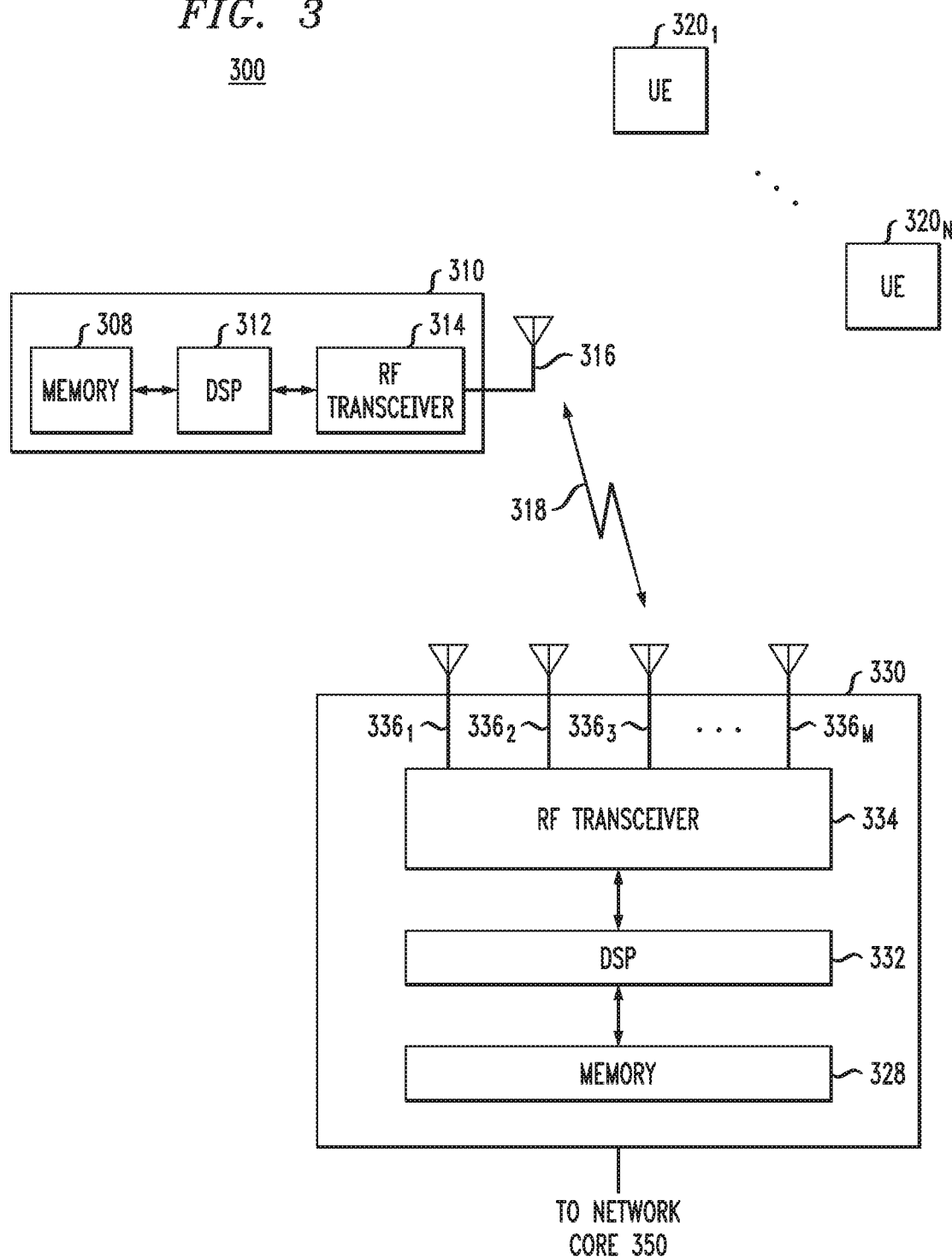
FIG. 3 shows a block diagram of yet another communication system in which some alternative embodiments can be practiced.

FIG. 3 shows a block diagram of a wireless communication system 300 in which some alternative embodiments can be practiced. System 300 includes a mobile terminal 310, a plurality of mobile terminals $320_1$-$320_N$, and a base station 330 operatively connected to a network core 350. In an example embodiment, base station 330 can be an instance of an evolved Node B (eNB) or a next-generation Node B (gNB). In the context of different generations (e.g., 3G, 4G, and/or 5G, or even future evolutions of 5G, such as 6G) of wireless networks, a mobile terminal, such as any of mobile terminals 310 and $320_1$-$320_N$, may be referred to as user equipment (UE), and network core 350 may be referred to as the evolved packet core (EPC). Base station 330 may be a part of an evolved UMTS terrestrial radio access network (E-UTRAN) that has additional base stations (not explicitly shown in FIG. 3) operatively connected to base station 330 and network core 350 as known in the pertinent art, or form part of 5G, 6G, or future evolutions of wireless networks. Herein, the term UMTS stands for Universal Mobile Telecommunications System.

In an example embodiment, mobile terminal 310 comprises at least one DSP 312 coupled to at least one memory 308 and interfaced to a radio-frequency (RF) transceiver 314 that is connected to one or more antennas 316 in a manner that enables the mobile terminal to establish and maintain a wireless link 318 with base station 330. In operation, wireless link 318 enables mobile terminal 310 to send uplink signals to base station 330 and receive downlink signals from the base station, e.g., to support and carry a phone call or a data session. Each of mobile terminals $320_1$-$320_N$ can be functionally and/or structurally similar to mobile terminal 310. In some embodiments, mobile terminals $320_1$-$320_N$ may not be present. In various embodiments, mobile terminal 310 can be a cellular telephone, a smartphone, a handheld computer, a personal media device, a smart watch, an IoT device, a gaming device, a smart car, etc.

In an example embodiment, base station 330 comprises at least one DSP 332 coupled to at least one memory 308 and interfaced to an RF transceiver 334 that is connected to a plurality of antennas $336_1$-$336_M$ in a manner that enables the base station to establish and support wireless link 318 and/or one or more other wireless links (not explicitly shown in FIG. 3) with mobile terminals $320_1$-$320_N$. For example, base station 330 may broadcast data that enable mobile terminal 310 to first select the cell served by the base station to be the serving cell and then establish wireless link 318.

In an example embodiment, some or all of DSPs 312 and 332 and memories 308 and 328 can be used to implement at least some embodiments described below in reference to FIGS. 4-10.

Figure 4:
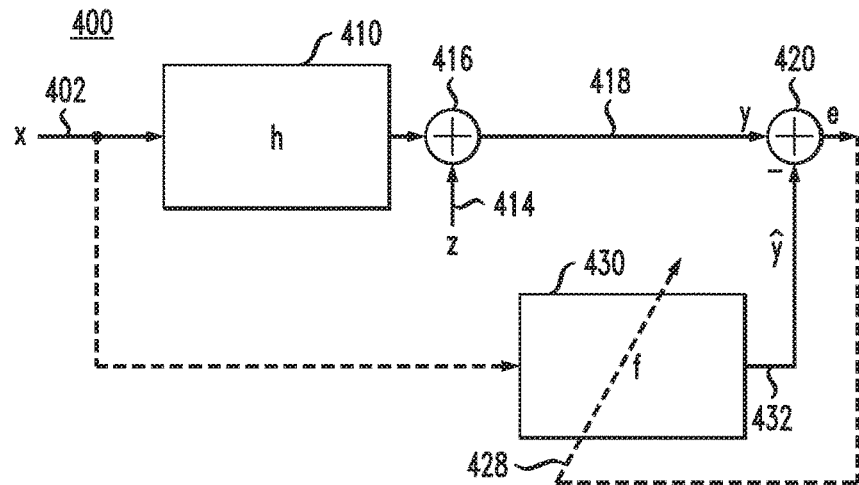
FIG. 4 shows a schematic diagram of signal transmission and processing that includes channel estimation according to an embodiment.

FIG. 4 shows a schematic diagram 400 of signal transmission and processing that includes channel estimation according to an embodiment. The signal-processing part of diagram 400 can be implemented, e.g., in one or more DSPs of at least some of systems 100, 200, and 300 (FIGS. 1-3).

Diagram 400 includes finite impulse response (FIR) filters 410 and 430 and adders 416 and 420. Filter 410 and adder 416 represent the communication channel between the corresponding data transmitter and data receiver (also see FIGS. 1-3). Filter 430 and adder 420 represent the DSP circuitry used for channel estimation.

Filter 410 can mathematically be represented by an L-component column vector $h=[h_0 h_1 \ldots k_{L-1}]^T$, where L is a positive integer; and the superscript T means transposed. The vector h typically depends on time t, i.e., h=h(t). A data signal 402 transmitted by the data transmitter can mathematically be represented by an L-component column vector $x_k=[x_k x_{k-1} \ldots x_{k-L+1}]T$, where k is the time index that identifies the last time slot of the transmitted sequence ($x_k$, $x_{k-1}$, . . . , $x_{k-L+1}$). Adder 416 represents the injection of additive noise 414 into the received signal. A resulting data signal 418 received by the data receiver is given by Eq. (1):

$$y_k = h(t)^H x_k + z_k \quad (1)$$

where $y_k$ denotes signal 418 in the k-th time slot; the superscript H denotes the Hermitian; and $z_k$ denotes the additive noise corresponding to the k-th time slot.

Filter 430 can mathematically be represented by an L-component column vector $f=[f_0 f_1 \ldots f_{L-1}]^T$. Filter 430 receives a copy of signal 402 as an input and generates a filtered signal 432 as an output. In practice, the provision of a copy of signal 402 to filter 430 can be implemented using pilot signals (e.g., signals a priori known to the receiver) or using a suitable decision-feedback path in the receiver. The settings of filter 430 can be updated in response to a feedback error signal 428, which is generated by adder 420 in accordance with Eqs. (2a)-(2b):

$$\hat{y}_k = f_k^H x_k \quad (2a)$$

$$e_k = y_k - \hat{y}_k \quad (2b)$$

where $e_k$ denotes signal 428 in the k-th time slot; $\hat{y}_k$ denotes signal 432 in the k-th time slot; and $f_k$ denotes the vector f in the k-th time slot. In an example embodiment, the recursive formula for updating filter 430 is given by Eq. (3):

$$f_{k+1} = f_k + \mu x_k e_k^H \quad (3)$$

where μ is the convergence coefficient. In general, the value of the convergence coefficient μ determines how quickly filter 430 converges towards the optimal configuration as well as the magnitude of the residual noise after the convergence. As such, the convergence coefficient μ controls the rate of convergence of filter 430 to an optimal configuration. As already indicated above, some embodiments provide methods and apparatus for adaptively controlling the value of the convergence coefficient μ based on the observed channel-dynamicity patterns, e.g., using reinforcement learning and/or an ANN.

Figure 5:
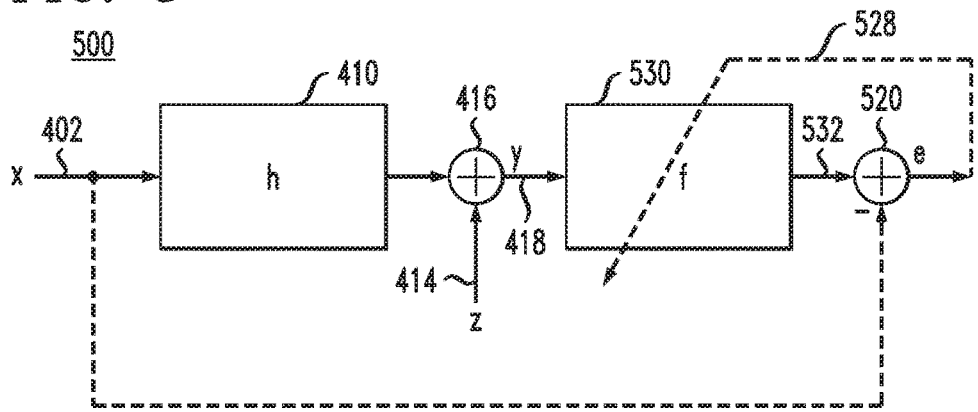
FIG. 5 shows a schematic diagram of signal transmission and processing that includes signal equalization according to an embodiment.

FIG. 5 shows a schematic diagram 500 of signal transmission and processing that includes signal equalization according to an embodiment. The signal-processing part of diagram 500 can be implemented, e.g., in one or more DSPs of at least some of systems 100, 200, and 300 (FIGS. 1-3).

The signal-transmission portion of diagram 500 is the same as that of diagram 400 and includes filter 410 and adder 416 (also see FIG. 4). The signal-processing portion of diagram 500 includes a FIR filter 530 and an adder 520. Similar to filter 430 (FIG. 4), filter 530 can mathematically be represented by an L-component column vector $f=[f_0 f_1 \ldots f_{L-1}]^T$. Filter 530 receives signal 418 (see Eq. (1)) as an input and generates a filtered signal 532 as an output. The settings of filter 530 can be updated in response to a feedback error signal 528, which is generated by adder 520 in accordance with Eq. (4):

$$e_k = x_k - f_k^H y_k \quad (4)$$

where $e_k$ denotes signal 528 in the k-th time slot; $x_k$ denotes signal 402 in the k-th time slot; $f_k$ denotes the vector f in the k-th time slot; and $y_k=[y_k y_{k-1} \ldots y_{k-L+1}]$ is a vector that represents the sequence ($y_k$, $y_{k-1}$, . . . , $y_{k-L+1}$) applied by signal 418 to filter 530. In an example embodiment, the recursive formula for updating filter 530 is given by Eq. (5):

$$f_{k+1} = f_k + \mu y_k e_k^H \quad (5)$$

where μ is the convergence coefficient. Herein, the value of the convergence coefficient μ can be adaptively controlled based on the observed channel-dynamicity patterns. In theory, under steady-state conditions and after filter 530 converges to an optimal configuration, output signal 532 can be approximated as a delayed version of the transmitter output signal 402, e.g., in accordance with Eq. (6):

$$f^* h^* x_k \approx x_{k-\delta} \quad (6)$$

where h denotes the transfer function of the communication channel; f denotes the transfer function of filter 530; the * symbol denotes the convolution operation; and δ is the propagation/processing delay.

Diagram 500 may also be applicable to DSL vectoring applications, in which the precoder and/or postcoder matrices need to be updated to track the changing communication channel, e.g., based on the appropriate error feedback. A person of ordinary skill in the pertinent art will readily understand how to modify Eqs. (4)-(6) for such applications, e.g., by replacing certain vectors therein by the corresponding matrices.

Figure 6:
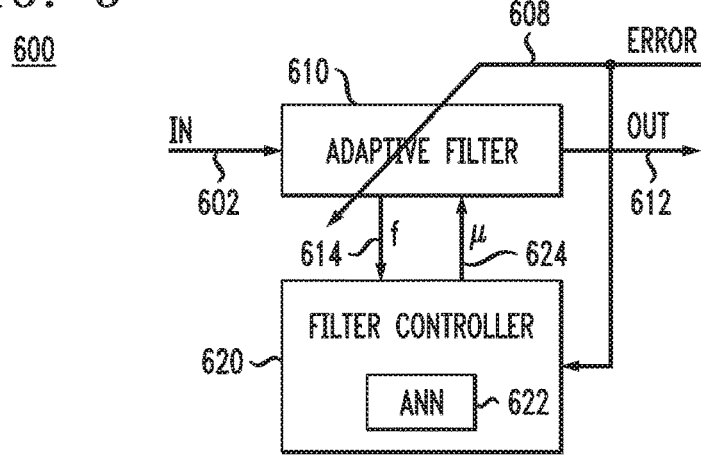
FIG. 6 shows a block diagram of a digital circuit according to an embodiment.

FIG. 6 shows a block diagram of a digital circuit 600 according to an embodiment. In some embodiments, digital circuit 600 may be a part of one of the DSPs used in system 100, 200, or 300. In some other embodiments, digital circuit 600 may be partitioned and distributed among two or more DSPs used in system 100, 200, or 300.

In some embodiments, circuit 600 may be configured to perform channel estimation, e.g., generally in accordance with the schematic diagram of FIG. 4. In some other embodiments, circuit 600 may be configured to perform signal equalization, e.g., generally in accordance with the schematic diagram of FIG. 5.

Circuit 600 comprises an adaptive (e.g., FIR) filter 610 configured to generate a filtered digital signal 612 in response to a digital input signal 602. In an example embodiment, circuit 600 may be located within the chain of signal processing of the corresponding DSP. Depending on the embodiment, the circuits located upstream from circuit 600 in said chain may include one or more of: (i) an analog-to-digital converter (ADC); (ii) a Fourier-transform circuit; (iii) a serial-to-parallel converter; and (iv) a cyclic-prefix-removal circuit. The circuits located downstream from circuit 600 in said chain may include one or more of: (i) a demodulator; (ii) a decoder; (iii) a deframer; (iv) a decapsulation circuit; and (v) an error-correction circuit. A person of ordinary skill in the pertinent art will readily understand how to connect circuit 600 in the chain of signal processing suitable for a given specific application. In some embodiments, filter 610 may be connected to operate in the frequency domain. In some other embodiments, filter 610 may be connected to operate in the time domain.

The configuration of filter 610 is updated based on an error signal 608, e.g., the signal e of FIG. 4 or FIG. 5. Depending on the embodiment and the mode of operation, error signal 608 can be obtained using one or more of: (i) a set of synchronization symbols; (ii) a preamble; (iii) a pilot sequence; and (iv) decision-aided feedback at the corresponding data receiver. Two possible examples of generating error signal 608 are described above in reference to FIGS. 4 and 5 (e.g., see signals 428 and 528 therein).

In an example embodiment, filter 610 is configured to update the filter coefficient(s) by running an LMS or similar (e.g., another gradient descent) algorithm that uses the convergence coefficient $\mu$ or a functional equivalent thereof to determine the update increment(s). In other words, the convergence coefficient $\mu$ or the functional equivalent thereof is a parameter of the filter-update algorithm that controls the rate of convergence toward an optimal filter configuration. In some embodiments, such an update may be implemented generally in accordance with Eq. (3) or (5).

Circuit 600 further comprises an electronic filter controller 620 operatively connected to filter 610 as indicated in FIG. 6. In operation, controller 620 can change the value of the convergence coefficient $\mu$ used in filter 610 in response to error signal 608 and the recent history of the filter-coefficients updates obtained from filter 610 by way of a control signal 614. The corresponding $\mu$-update instruction is communicated back to filter 610 by way of a control signal 624.

In some embodiments, only a part of the error signal and/or filter-coefficients updates may be communicated to controller 620. Herein, the "part" means that some error and coefficient values may not be sent to or accepted by controller 620, e.g., due to throughput constraints. In some embodiments, the error signal directed to controller 620 may be a batch-type signal, with each batch thereof providing a history of the error signal corresponding to a respective time interval.

In an example embodiment, a change of the convergence coefficient $\mu$ may have the following impact on the overall system performance and/or on filtered digital signal 612. A relatively small $\mu$ typically results in a relatively small steady-state error (i.e., a relatively high signal-to-noise ratio, SNR), but causes filter 610 to move towards an optimum configuration at a relatively slow pace and/or results in relatively slow reactance of the filter to communication-channel changes. In contrast, a relatively large $\mu$ value typically results in a higher steady-state error (i.e., a lower SNR), but causes filter 610 to move towards an optimum configuration at a faster pace and/or results in relatively fast reactance of the filter to communication-channel changes.

In operation, filter controller 620 may select a new (e.g., different) value of the convergence coefficient $\mu$ and communicate said value to filter 610 by way of control signal 624 by executing one or more of the following example processing steps: (i) comparing a currently observed processing state with a set of reference (e.g., previously learned) processing states; (ii) finding a closest match to the currently observed processing state in the set of previously learned processing states; (iii) retrieving from the memory the value of the convergence coefficient $\mu$ corresponding to the matched processing state; and (iv) generating an appropriate control signal 624 to instruct filter 610 to use the retrieved value of the convergence coefficient $\mu$ instead of the previously used value. In an example embodiment, a processing state and/or channel-dynamicity pattern is represented by the history of filter updates provided by control signal 614 and the sequence of error values provided by error signal 608.

In some embodiments, the $\mu$ values may be selected from a discrete set of two or more fixed values. In some other embodiments, the $\mu$ values may be selected from a continuous range of values having fixed boundaries. Such set or range is a hyperparameter of the corresponding algorithm (also see the description of step 702 of method 700 below).

In an example embodiment, a set of learned processing states may be loaded into a memory (not explicitly shown on FIG. 6) of controller 620 during a training (or learning) mode of operation. An example embodiment of a signal-processing method that may be used during such training mode is described in reference to FIGS. 7-8. An example embodiment of a signal-processing method that may be used during a working mode of operation is described in reference to FIG. 9. During such operational or working mode, controller 620 uses the learned processing states stored therein and signals 608 and 614 corresponding to actual payload data to adaptively select a value of the convergence coefficient $\mu$ for being used in filter 610.

In some embodiments, controller 620 comprises an ANN 622 configured to learn and match different processing states and select $\mu$ values based on reinforcement learning. In some other embodiments, controller 620 of similar functionality may be implemented without an ANN.

Herein, the term "reinforcement learning" (or RL) generally refers to an area of machine learning concerned with how software and/or hardware control agents (e.g., electronic controllers) ought to take actions in an environment to optimize (e.g., maximize) some benefit (e.g., cumulative reward). RL is one of three basic machine-learning paradigms, which also include supervised learning and unsupervised learning. In an example implementation, RL may be applied to achieve an acceptable balance between exploration of the uncharted territory and exploitation of the currently available knowledge of the environment.

The environment for RL may be formulated in the form of a Markov decision process (MDP), e.g., because many RL algorithms so formulated may utilize dynamic programming techniques. One noticeable difference between classical dynamic programming methods and RL algorithms is that the latter do not assume knowledge of an exact mathematical model of the MDP and tend to be applied to relatively large MDPs for which more-exact methods may not be technically feasible.

RL, due to its generality, is used in many disciplines, such as game theory, control theory, operations research, information theory, simulation-based optimization, multi-agent systems, swarm intelligence, statistics, and genetic algorithms. In some literature, RL may also be referred to as approximate dynamic programming or neuro-dynamic programming.

In an example embodiment, ANN 622 can be implemented using one or more of the following: (i) a software program executed by a general-purpose or specialized electronic processor; (ii) a field-programmable gate-array (FPGA) device; and (iii) an application-specific integrated circuit (ASIC). In some embodiments, ANN 622 can be implemented using an optical processor, e.g., as described in U.S. Pat. No. 7,512,573, which is incorporated herein by reference in its entirety.

In an example embodiment, a PE used in ANN 622 can be implemented using one or more of the following non-exclusive list of electrical circuits or software equivalents (e.g. programmed in a DSP) thereof: (i) a multiplier circuit; (ii) an adder; (iii) a comparator; and (iv) a nonvolatile-memory cell. Other suitable implementations of PEs and/or ANNs may alternatively be used in other embodiments, as judged appropriate by persons of ordinary skill in the pertinent art.

Figure 7:
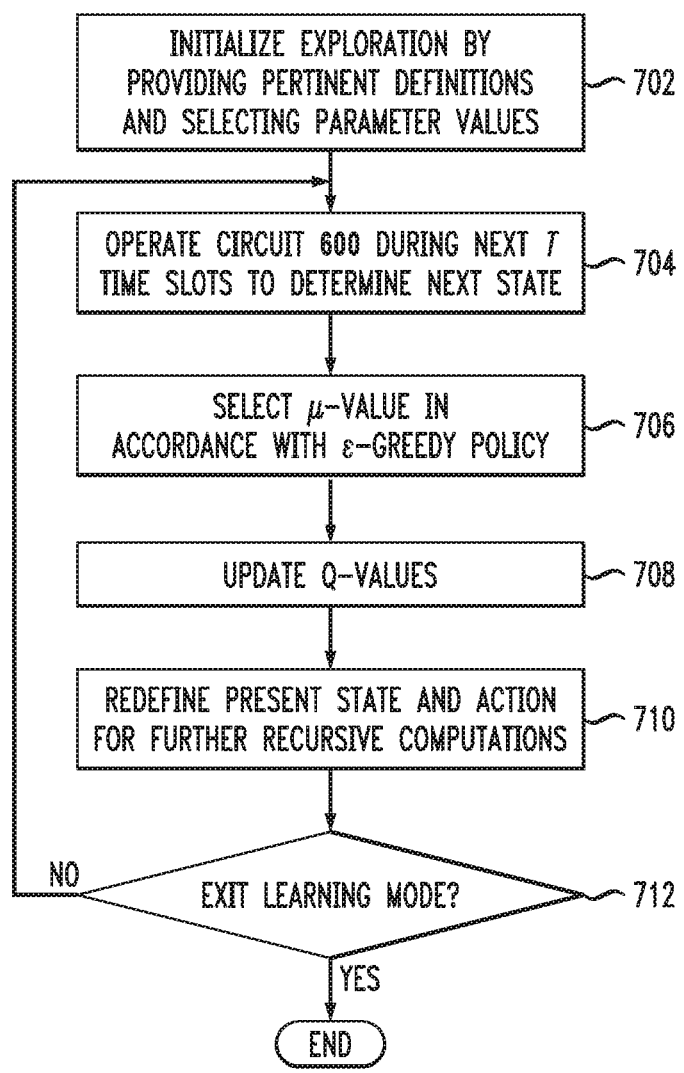
FIG. 7 shows a flowchart of a signal-processing method that can be implemented using the digital circuit of FIG. 6 according to an embodiment.

FIG. 7 shows a flowchart of a signal-processing method 700 that can be implemented using circuit 600 according to an embodiment. In an example embodiment, method 700 can be used in a learning mode of operation of circuit 600. Under some alternative terminologies used in the pertinent literature, the learning mode can also be referred to as the training mode or phase or the exploration mode or phase.

In an example embodiment, method 700 is implemented using some elements of the ε-greedy method. In some embodiments, method 700 can be implemented using some elements of the SARSA algorithm, where SARSA stands for state-action-reward-state-action. Herein, the description of method 700 generally adheres to the conventional terminology used in the field of reinforcement learning. For additional clarity, some of the terms of art used in the description of method 700 are briefly explained below.

Circuit 600 may be referred to as an agent that interacts with the environment represented by signals 602, 608, and 612. For example, the agent can observe different states in the environment and take actions. In response to an action, the observed state may change, and the agent may get a reward. Q-values are used to quantify the quality of actions. For example, in the SARSA algorithm, the main function for updating the Q-value depends on the current state $S_1$, the action $A_1$ the agent chooses in the state $S_1$, the reward the agent gets for choosing the action $A_1$, the state $S_2$ that is observed after the action $A_1$ is taken, and the next action $A_2$ the agent chooses in the state $S_2$.

One simple policy that can be used by the agent to select the next action is referred to as the greedy policy. The greedy policy is aimed at maximizing the Q-value, but is known as being susceptible to converging to a suboptimal steady state. A modification of the greedy policy is referred to as the ε-greedy policy. Under the latter, with the probability of (1−ε), the agent takes action using the greedy policy. With the probability of ε, the agent takes a random action. Herein, the factor ε represents a tradeoff between exploitation of the available knowledge and continued exploration of the environment. As such, the factor ε may be referred to as the tradeoff factor.

In method 700, the actions taken by circuit 600 include choosing a μ value. For illustration purposes and without any implied limitations, method 700 is described below in reference to an embodiment in which the convergence coefficient μ is selected from a set consisting of two discrete values. A person of ordinary skill in the art will readily understand how to modify method 700 to expand the available selection of values for the convergence coefficient μ to more than two discrete values or to a continuous range of values.

Method 700 begins at step 702, where the corresponding algorithm is initialized. For example, since method 700 is an iterative method, it implicitly assumes an initial condition before the first update occurs. Step 702 can therefore be used to set such initial condition(s). Step 702 can also be used to assign to the relevant algorithm parameters their values. One subset of those algorithm parameters may be changed in the subsequent processing steps of method 700. Another subset of those algorithm parameters may remain fixed in the subsequent processing steps of method 700.

The following description outlines example sub-steps that may be performed at step 702.

The discrete set A of available actions is defined. For example, the following definition of the set A may be used: $\mu \in \{0.05, 1.1\}$. The initial value of the convergence coefficient μ is then selected, e.g., μ=0.05. This initial selection may be made, e.g., randomly from the set A or using some other conventional method of hyperparameter selection relied on in RL.

One or more features of a state are defined. In general, such a feature may be represented by any suitable function of some signals available to circuit 600. Different features are typically represented by different (linear or nonlinear) functions of those signals. As an example, the following two features defined by Eqs (7)-(8), respectively, may be used in an example embodiment in which filter 610 is a single-tap FIR filter:

$$E_k = \frac{1}{T} \sum_{l=k-T+1}^{k} 20\log_{10}|e_l| \tag{7}$$

$$F_k = \frac{|f_k - f_{k-T+1}|}{|f_k|} \tag{8}$$

Herein, T is the number of time slots in the observation window; $e_l$ denotes signal 608 in the l-th time slot; and $f_k$ denotes the filter coefficient used in the k-th time slot. For example, the number T can be T=100. The number T is yet another hyperparameter, which can be selected, e.g., using a suitable conventional method of hyperparameter selection used in RL.

A plurality of states is defined using the corresponding features. In some embodiments, the states may be discrete, with a well-defined border between them. In some other embodiments, gradual transitions between the states may also be used.

Figures 8, 9:
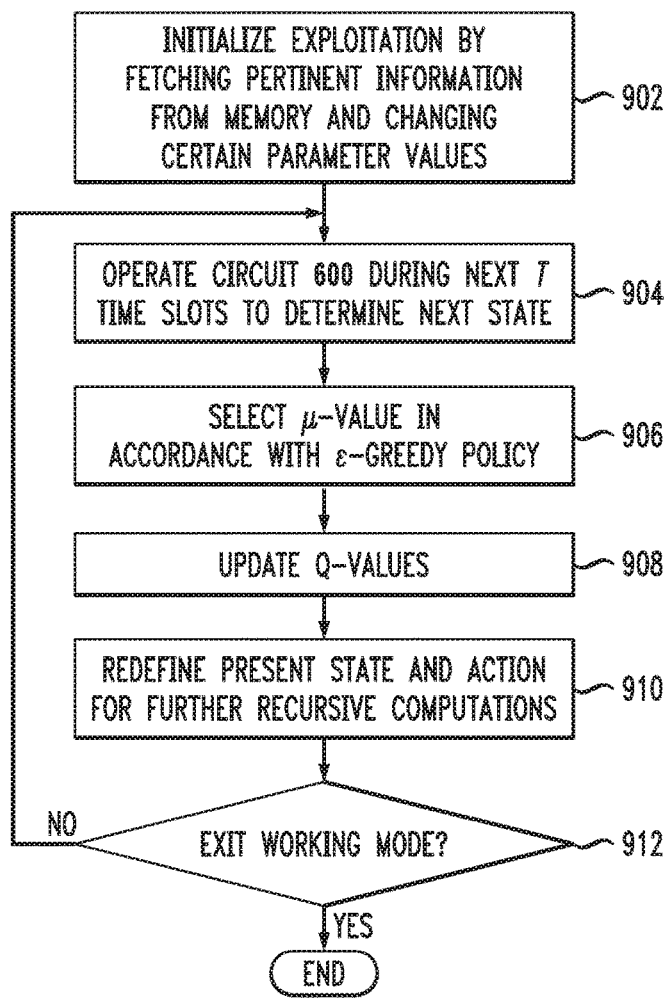
FIG. 8 shows a state definition that can be used for operating the signal-processing method of FIG. 7 according to an example embodiment.
FIG. 9 shows a flowchart of another signal-processing method that can be implemented using the digital circuit of FIG. 6 according to an embodiment.

FIG. 8 shows a state definition that can be used in method 700 according to an example embodiment. More specifically, the table shown in FIG. 8 defines twelve distinct states using the features $E_k$ and $F_k$ defined by Eqs. (7)-(8). In an alternative embodiment, more or fewer states may be defined.

Referring back to FIG. 7 and step 702, wherein also the reward function R and the Q-value function Q are defined. Typically, R=R(S,A) and Q=Q(S,A). In other words, the rewards and Q-values depend both on the state and the action taken in that state. As an example, the following function definitions may be used:

$$R=-E_k \quad (9)$$

$$Q(S,A) \leftarrow Q(S,A)+\alpha[R+\gamma Q(S',A')-Q(S,A)] \quad (10)$$

Herein, $E_k$ is given by Eq. (7). Eq. (10) gives the recursive update formula for the Q-values. (S, A) is the present state-action pair, and (S', A') is the next state-action pair. The parameter α is the learning rate that determines to what extent the newly acquired information supersedes the old information. For example, setting the learning rate α to zero will make the agent not learn anything, while the learning rate α of 1 would make the agent consider only the most recent information. In an example embodiment, the learning rate α can be α=0.1. The parameter γ is the discount factor that determines the importance of future rewards. For example, the discount factor of zero makes the agent consider only current rewards, while the discount factor that is close to 1 will make the agent strive for a high long-term reward. In an example embodiment, the discount factor γ can be γ=0.3.

The tradeoff factor ε is set to a value that promotes exploration. In an example embodiment of method 700, the tradeoff factor ε can be ε=0.3.

The filter coefficients used in filter 610 are set to initial values.

At step 704, controller 620 operates to determine the state S' (also see Eqs. (7)-(10)). In an example embodiment, step 704 may include the following sub-steps: (i) collecting signals 608 and 614 during the present observation window of T time slots; (ii) computing the one or more state features defined at step 702 (see, e.g., Eqs. (7)-(8)); and (iii) using the computed features and the state definitions produced at step 702 to determine the state S' (also see FIG. 8).

At step 706, controller 620 operates to select the action A'. As already indicated above, the actions used in method 700 comprise selecting μ values from the corresponding set of values defined at step 702. In an example embodiment, the μ-value selection at step 706 is performed in accordance with the ε-greedy policy and the ε value set at step 702.

At step 708, controller 620 performs an update of the Q-values using the results of steps 704 and 706, e.g., in accordance with Eq. (10). In an example embodiment, Eq. (9) can be used for computing the reward R used in Eq. (10).

At step 710, controller 620 redefines the state S and the action A for further recursive computations (if any). More specifically, the following (re)definitions can be applied:

$$S \leftarrow S' \quad (11)$$

$$A \leftarrow A' \quad (12)$$

Step 712 serves to determine whether or not to exit the learning mode of operation. In general, any suitable criteria may be used for making this decision at step 712. For example, the number of loops through steps 704-710 may be limited to some fixed predetermined number. Alternatively or in addition, Q-value updates of steps 708 may be tracked, and the changes thereof may be compared to a fixed threshold value. If the decision is to exit, then the processing of method 700 is terminated, and circuit 600 is typically switched into the working mode. Otherwise, the processing of method 700 is directed back to step 704.

FIG. 9 shows a flowchart of a signal-processing method 900 that can be implemented using circuit 600 according to an embodiment. In an example embodiment, method 900 can be used in a working mode of operation of circuit 600. Under some alternative terminologies used in the pertinent literature, the working mode can also be referred to as the exploitation mode or phase.

In an example embodiment, method 900 may be generally analogous to method 700. As such, the description of method 900 below primarily focuses on the parts of method 900 that are different from the corresponding parts of method 700.

Method 900 begins at step 902, where the corresponding algorithm is initialized. In an example embodiment, step 902 may comprise fetching the pertinent information from the memory where the results of the most recent run of method 700 are stored. For example, method 900 may rely on the same state and function definitions as method 700.

Some parameter values may remain unchanged, while some other parameter values may be changed. Noticeably, the tradeoff factor ε is set to a value that significantly limits exploration and enhances exploitation of the previously obtained knowledge. In an example embodiment of method 900, the tradeoff factor ε can be ε=0.001. In another example embodiment of method 900, the tradeoff factor ε can be ε=0, meaning that the greedy policy is going to be implemented at step 906 instead of the ε-greedy policy.

Steps 904-910 of method 900 are generally similar to steps 704-710 of method 700. Note however that a much smaller tradeoff factor ε is typically used at step 906 than at step 706, e.g., as indicated by the respective example ε values given above.

Step 912 serves to determine whether or not to exit the working mode of operation. For example, the working mode of operation may be terminated when certain specific triggers are detected. Nonexclusive examples of such triggers may include: (i) a configuration change during which an end user is added or removed; (ii) an occurrence of unsatisfactory performance, e.g., exemplified by an increased number of codeword violations; (iii) unacceptable SNR or BER; (iv) a relatively quiet period, with little or no payload data being transmitted therein. If the decision is to exit, then the processing of method 900 is terminated, and circuit 600 is typically switched into the learning mode. Otherwise, the processing of method 900 is directed back to step 904.

Figure 10C:
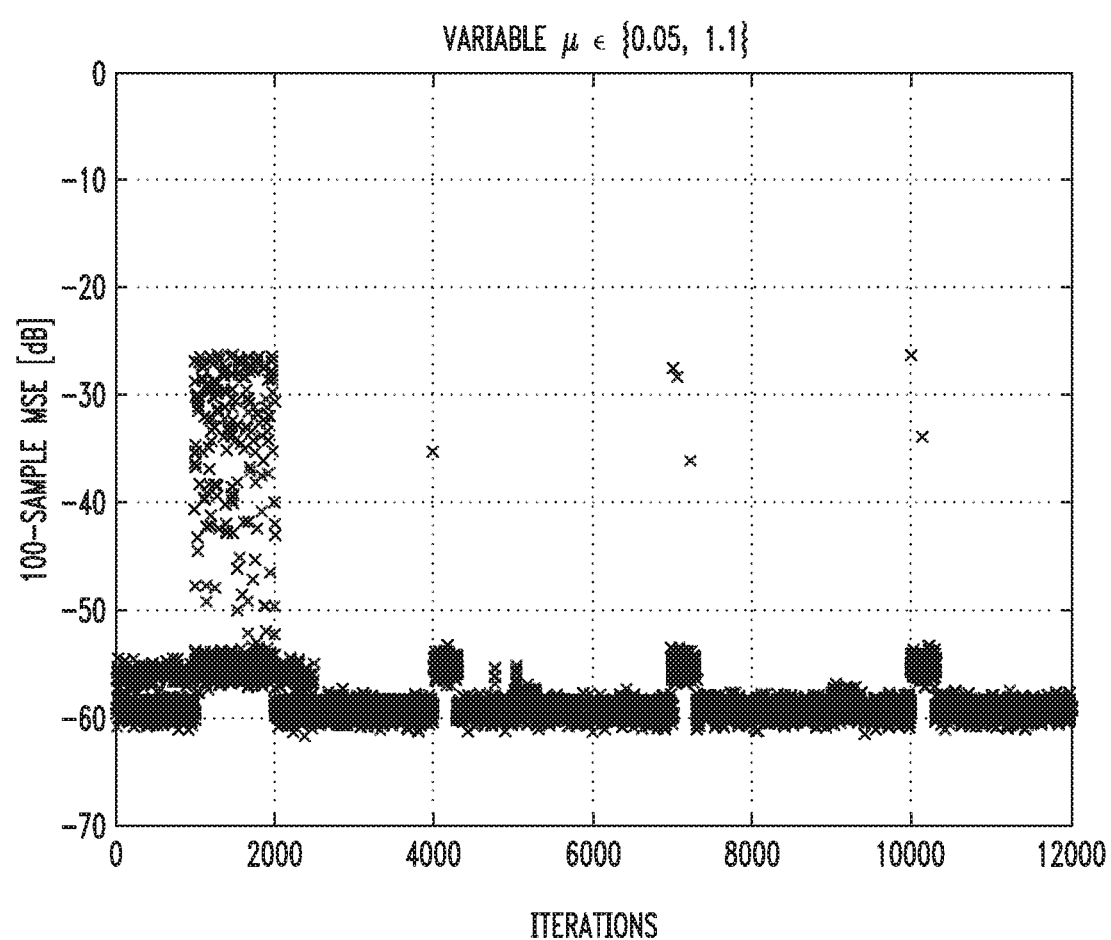

FIGS. 10A-10C graphically illustrate example performance improvements that can be obtained according to an embodiment. Each of the data points in FIGS. 10A-10C shows the mean square error (MSE) in dB averaged over 100 samples for the single-tap LMS equalization carried out using filter 610. The simulation results of FIG. 10A correspond to the fixed convergence coefficient μ=0.05. The simulation results of FIG. 10B correspond to the fixed convergence coefficient μ=1.1. The simulation results of FIG. 10C correspond to the variable convergence coefficient μ∈{0.05, 1.1}, with the μ value being selected in accordance with methods 700 and 900.

The simulation results of each of FIGS. 10A-10C have been obtained under the following identical channel conditions. The communication channel exhibits relatively high dynamicity during the iteration intervals [1000:2000], [4000:4300], [7000:7300] and [10000:10300]. The communication channel exhibits relatively low dynamicity during the iteration intervals [5000:5300] and [9000:9300]. The communication channel is static during the remaining iteration intervals. In practical communication systems, similar channel conditions can be observed, e.g., due to wind bursts shaking aerial copper cables.

Referring to FIG. 10A, the simulation results shown therein indicate that the small fixed $\mu$ causes poor performance of the LMS algorithm and filter 610 during the intervals of high dynamicity. The LMS algorithm and filter 610 still perform relatively well when the channel is static and during the intervals of low dynamicity. The MSE floor is about −59 dB.

Referring to FIG. 10B, the simulation results shown therein indicate that the large fixed $\mu$ enables the LMS algorithm and filter 610 to track and compensate for the dynamic channel relatively well. However, the MSE floor is now about −56 dB, which is 3 dB higher than in FIG. 10B.

Referring to FIG. 10C, during the first 2500 iterations, the system is in the learning mode and runs method 700. After that, the system is switched into the working mode and runs method 900. The simulation results of FIG. 10C clearly show that controller 620 succeeds in choosing an appropriate respective $\mu$ value for each of the qualitatively different intervals, with the improved performance as a result. More specifically, during the intervals of high dynamicity, controller 620 selects the large $\mu$ value, which produces the MSE floor of about −56 dB (i.e., as in FIG. 10B). During the intervals of high dynamicity or under static channel conditions, controller 620 selects the small $\mu$ value, which produces the MSE floor of about −59 dB (i.e., as in FIG. 10A). In other words, circuit 600 advantageously delivers optimal performance results for any of the three different channel-dynamicity levels.

According to an example embodiment disclosed above, e.g., in the summary section and/or in reference to any one or any combination of some or all of FIGS. 1-10, provided is an apparatus comprising: a data receiver (e.g., 130, FIG. 1; 214, FIG. 2; 334, FIG. 3) and at least one digital signal processor (e.g., 114, FIG. 1; 202, FIG. 2; 332, FIG. 3) connected to process a digital signal (e.g., 602, FIG. 6) representing a communication signal received by the data receiver; and wherein the at least one digital signal processor comprises an adaptive filter (e.g., 610, FIG. 6) and an electronic controller (e.g., 620, FIG. 6), the adaptive filter being iteratively updated to filter the digital signal, the electronic controller controlling a rate of convergence of the adaptive filter (e.g., by changing $\mu$, Eqs. (3), (5)) based on reinforcement learning.

In some embodiments of the above apparatus, the adaptive filter comprises a finite-impulse-response filter.

In some embodiments of any of the above apparatus, the electronic controller comprises an artificial neural network (e.g., 622, FIG. 6).

In some embodiments of any of the above apparatus, the adaptive filter is updated using a least mean squares algorithm and based on an error signal (e.g., 608, FIG. 6) produced using a filtered signal (e.g., 612, FIG. 6) generated by the adaptive filter in response to the digital signal.

In some embodiments of any of the above apparatus, the error signal is produced using decision-aided feedback.

In some embodiments of any of the above apparatus, the error signal is produced based on a pilot signal.

In some embodiments of any of the above apparatus, the electronic controller is connected to receive the error signal and a history of filter updates (e.g., 614, FIG. 6).

In some embodiments of any of the above apparatus, the electronic controller is configured to change a convergence coefficient of the least mean squares algorithm (e.g., at 706, FIG. 7; at 906, FIG. 9) based on the error signal and the history of filter updates.

In some embodiments of any of the above apparatus, the electronic controller is configured to implement said reinforcement learning using an $\varepsilon$-greedy method (e.g., at 706, FIG. 7; at 906, FIG. 9).

In some embodiments of any of the above apparatus, a tradeoff factor used in the $\varepsilon$-greedy method is variable.

In some embodiments of any of the above apparatus, the electronic controller is configured to use a plurality of states for said reinforcement learning, the states being defined (e.g., table, FIG. 8) using one or more features (e.g., defined using Eqs. (7), (8)) computed based on an error signal (e.g., 608, FIG. 6) and a history of filter updates (e.g., 614, FIG. 6).

In some embodiments of any of the above apparatus, the electronic controller is configured to compute Q-values used in said reinforcement learning (e.g., at 708, FIG. 7; at 908, FIG. 9) based on an error signal (e.g., 608, FIG. 6) and a history of filter updates (e.g., 614, FIG. 6).

In some embodiments of any of the above apparatus, the apparatus further comprises a digital-subscriber-line system (e.g., 100, FIG. 1) that includes the data receiver.

In some embodiments of any of the above apparatus, the apparatus further comprises a passive-optical-network system (e.g., 200, FIG. 2) that includes the data receiver.

In some embodiments of any of the above apparatus, the apparatus further comprises a base station (e.g., 330, FIG. 3) of a wireless communication system (e.g., 300, FIG. 3), the base station comprising the data receiver.

In some embodiments of any of the above apparatus, the data receiver is a wireless data receiver (e.g., 314, 334, FIG. 3).

In some embodiments of any of the above apparatus, the at least one digital signal processor is configured to perform communication-channel estimation (e.g., in accordance with 400, FIG. 4).

In some embodiments of any of the above apparatus, the adaptive filter is configured to perform electronic signal equalization (e.g., in accordance with 500, FIG. 5).

In some embodiments of any of the above apparatus, the digital signal is a frequency-domain signal.

In some embodiments of any of the above apparatus, the digital signal is a time-domain signal.

According to another example embodiment disclosed above, e.g., in the summary section and/or in reference to any one or any combination of some or all of FIGS. 1-10, provided is an apparatus comprising: at least one processor (e.g., 114, FIG. 1; 202, FIG. 2; 332, FIG. 3); and at least one memory (e.g., 116, FIG. 1; 201, FIG. 2; 328, FIG. 3) including computer program code; and wherein the at least one memory and the computer program code are configured to, with the at least one processor, cause the apparatus at least to: (A) perform adaptive filtering (e.g., using 600, FIG. 6) of received communication-channel-impaired data; and (B) iteratively update said adaptive filtering while controlling a rate of convergence of said adaptive filtering based on reinforcement learning (e.g., 904-910, FIG. 9).

In some embodiments of the above apparatus, the at least one memory and the computer program code are further configured to, with the at least one processor, cause the apparatus to update the adaptive filtering based on a least mean squares algorithm and based on an error signal (e.g., 608, FIG. 6) produced using a filtered signal (e.g., 612, FIG. 6) generated by said adaptive filtering of the received communication-channel-impaired data.

In some embodiments of any of the above apparatus, the at least one memory and the computer program code are further configured to, with the at least one processor, cause the apparatus at least to control the rate of convergence of the adaptive filtering by changing a convergence coefficient of the least mean squares algorithm based on the error signal and a history (e.g., 614, FIG. 6) of the iterative updates.

In some embodiments of any of the above apparatus, the at least one memory and the computer program code are further configured to, with the at least one processor, cause the apparatus at least to further perform said reinforcement learning based on an ε-greedy method with a variable tradeoff factor (e.g., 706, FIG. 7; 906, FIG. 9).

In some embodiments of any of the above apparatus, the at least one memory and the computer program code are further configured to, with the at least one processor, cause the apparatus at least to further perform said reinforcement learning by defining a plurality of states (e.g., table, FIG. 8) using one or more features (e.g., defined using Eqs. (7), (8)) based on an error signal (e.g., 608, FIG. 6) and a history of the iterative updates (e.g., 614, FIG. 6), and using said plurality of states during said reinforcement learning.

In some embodiments of any of the above apparatus, the at least one memory and the computer program code are further configured to, with the at least one processor, cause the apparatus to perform communication-channel estimation (e.g., in accordance with 400, FIG. 4) or communication-signal equalization (e.g., in accordance with 500, FIG. 5).

According to yet another example embodiment disclosed above, e.g., in the summary section and/or in reference to any one or any combination of some or all of FIGS. 1-10, provided is a non-transitory machine-readable medium, having encoded thereon program code, wherein, when the program code is executed by a machine, the machine implements a method (e.g., 900, FIG. 9) comprising the steps of: (A) performing adaptive filtering (e.g., using 600, FIG. 6) of received communication-channel-impaired data; and (B) iteratively updating said adaptive filtering while controlling a rate of convergence of said adaptive filtering based on reinforcement learning (e.g., 904-910, FIG. 9).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   at least one processor; and
   at least one memory including program code; and
   wherein the at least one memory and the program code are configured to, with the at least one processor, cause the apparatus at least to:
      perform adaptive filtering of received communication-channel-impaired data;
      iteratively update said adaptive filtering while controlling a rate of convergence of said adaptive filtering based on reinforcement learning;
      cause the apparatus to update the adaptive filtering based on a least mean squares algorithm and based on an error signal produced using a filtered signal generated by said adaptive filtering of the received communication-channel-impaired data; and
      cause the apparatus at least to control the rate of convergence of the adaptive filtering by changing a convergence coefficient of the least mean squares algorithm based on the error signal and a history of the iterative updates.

2. The apparatus of claim 1, wherein the error signal is produced using decision-aided feedback.

3. The apparatus of claim 1, wherein the error signal is produced based on a pilot signal.

4. The apparatus of claim 1, wherein the at least one memory and the program code are further configured to, with the at least one processor, compute Q-values used in said reinforcement learning based on the error signal and the history of the iterative updates.

5. The apparatus of claim 1, wherein the at least one memory and the program code are further configured to, with the at least one processor, cause the apparatus to perform said reinforcement learning using an artificial neural network.

6. The apparatus of claim 1, wherein the at least one memory and the program code are further configured to, with the at least one processor, cause the apparatus at least to further perform said reinforcement learning based on an $\varepsilon$-greedy method with a variable tradeoff factor.

7. The apparatus of claim 1, wherein the at least one memory and the program code are further configured to, with the at least one processor, cause the apparatus at least to further perform said reinforcement learning by defining a plurality of states using one or more features based on the error signal and the history of the iterative updates, and using said plurality of states during said reinforcement learning.

8. The apparatus of claim 1, wherein the at least one memory and the program code are further configured to, with the at least one processor, cause the apparatus to perform communication-channel estimation or communication-signal equalization.

9. The apparatus of claim 1, wherein the apparatus further comprises an end-user device of a communications network.

10. The apparatus of claim 1, wherein the apparatus further comprises a network node of a communications network.

11. A non-transitory machine-readable medium, having encoded thereon program code, wherein, when the program code is executed by a machine, the machine implements a method comprising:
   performing adaptive filtering of received communication-channel-impaired data;
   iteratively updating said adaptive filtering while controlling a rate of convergence of said adaptive filtering based on reinforcement learning;
   updating the adaptive filtering based on a least mean squares algorithm and based on an error signal produced using a filtered signal generated by said adaptive filtering of the received communication-channel-impaired data; and
   at least controlling the rate of convergence of the adaptive filtering by changing a convergence coefficient of the least mean squares algorithm based on the error signal and a history of the iterative updates.

12. The non-transitory machine-readable medium of claim 11, wherein the method further comprises performing communication-channel estimation or electronic signal equalization.

13. An apparatus comprising:
at least one processor; and
at least one memory including program code; and
wherein the at least one memory and the program code are configured to, with the at least one processor, cause the apparatus at least to:
perform adaptive filtering of received communication-channel-impaired data;
iteratively update said adaptive filtering while controlling a rate of convergence of said adaptive filtering based on reinforcement learning; and
cause the apparatus at least to further perform said reinforcement learning based on an E-greedy method with a variable tradeoff factor.

14. An apparatus comprising a data receiver and at least one digital signal processor connected to process a digital signal representing a communication signal received by the data receiver;
wherein the at least one digital signal processor comprises an adaptive filter and an electronic controller, the adaptive filter being iteratively updated to filter the digital signal, the electronic controller controlling a rate of convergence of the adaptive filter based on reinforcement learning; and
wherein the electronic controller is configured to compute Q-values used in said reinforcement learning based on an error signal and a history of filter updates.

15. The apparatus of claim 14, wherein the adaptive filter is updated using a least mean squares algorithm and based on an error signal produced using a filtered signal generated by the adaptive filter in response to the digital signal.

16. The apparatus of claim 15, wherein the electronic controller is configured to change a convergence coefficient of the least mean squares algorithm based on the error signal and the history of filter updates.

17. The apparatus of claim 14, wherein the electronic controller is configured to implement said reinforcement learning using an $\varepsilon$-greedy method with a variable tradeoff factor.

18. The apparatus of claim 14, wherein the electronic controller is configured to use a plurality of states for said reinforcement learning, the states being defined using one or more features computed based on the error signal and the history of filter updates.

19. The apparatus of claim 14, wherein the at least one digital signal processor is configured to perform communication-channel estimation or electronic signal equalization.

* * * * *